United States Patent

[11] 3,569,734

[72] Inventors Gary L. Samuelson;
David C. Ailion, Salt Lake City, Utah
[21] Appl. No. 811,021
[22] Filed Mar. 27, 1969
[45] Patented Mar. 9, 1971
[73] Assignee University of Utah
Salt Lake City, Utah

[54] PULSE AND FREQUENCY COUNTER
5 Claims, 2 Drawing Figs.

[52] U.S. Cl. .......... 307/225,
307/224, 328/45, 328/48, 328/51
[51] Int. Cl. .......... H03k 21/16
[50] Field of Search .......... 307/224,
225, 226; 328/45, 48, 51

[56] References Cited
UNITED STATES PATENTS

| | | | |
|---|---|---|---|
| 3,252,134 | 5/1966 | Auer et al. .......... | 328/48X |
| 3,378,703 | 4/1968 | Huxster et al. .......... | 307/225X |
| 3,493,715 | 2/1970 | Bigowsky .......... | 328/48X |

*Primary Examiner*—John S. Heyman
*Attorney*—David V. Trask

ABSTRACT: A compact, multipurpose counter is constructed by interconnecting two, solid state, decimal counters with a solid state switching circuit constructed of inverting NOR gates.

INVENTORS
GARY L. SAMUELSON
DAVID C. AILION
BY David V. Trask
ATTORNEY

PATENTED MAR 9 1971 3,569,734

INVENTORS
GARY L. SAMUELSON
DAVID C. AILION

BY David V. Trask

ATTORNEY

PULSE AND FREQUENCY COUNTER

STATEMENT

The invention described herein was made in the course of or under a grant from the National Science Foundation, an agency of the United States Government.

BACKGROUND OF THE INVENTION

1. Field of the Invention

This invention is directed to digital counters and provides a compact, multipurpose counter which can be constructed from available semiconductor components at low cost.

2. State of the Art

Many types of digital counters are known. Several versatile commercial models are available, but these units are generally expensive. Available inexpensive models usually have very limited capabilities. Thus, heretofore, experimentalists have often had to proceed without obtaining all of the information desired because the counters available to them have lacked the necessary capability. The limitations of the equipment at hand undesirably influence experimental design.

SUMMARY OF THE INVENTION

The multipurpose counter of the present invention comprises two, inexpensive, multiple-decade, decimal counters interconnected by means of a function switch and associated circuitry constructed of readily available, inexpensive solid state components. The decimal counters are also interconnected by a range switch which can be set to limit the number of counts that either counter can accumulate. Thus, either counter may be caused to stop whenever the other counter reaches a predetermined number established by the setting of the range switch.

The function switch may be set to gate off most of the associated circuitry so that the two decimal counters independently monitor separate pulse trains. If desired, the two decimal counters may be connected to form a single, extended range counter. Alternatively, the function switch may be set to interconnect the two decimal counters with selected portions of the associated circuitry so that the total unit functions as a "frequency counter," a "time interval counter," or a "digital integrator," as needed.

DESCRIPTION OF THE DRAWINGS

In the drawings, which illustrate what is presently regarded as the best mode for carrying out the invention.

DESCRIPTION OF THE ILLUSTRATED EMBODIMENTS

Figure 1:
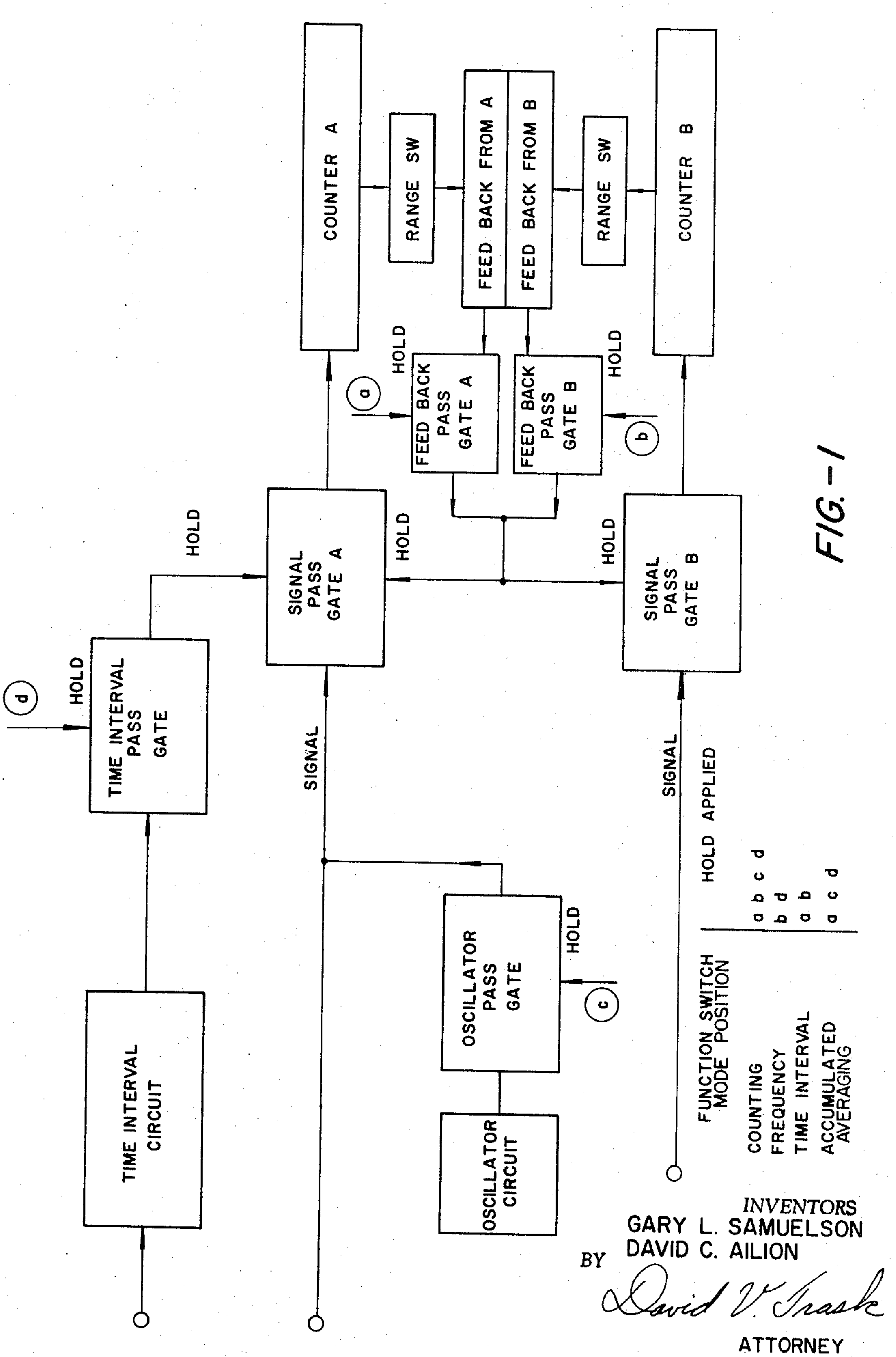
FIG. 1 is a block diagram of a preferred form of the invention coded to indicate which circuits are gated on and which circuits are gated off for each of four modes of operation.

Referring to the block diagram of FIG. 1, two decimal counters, designated counters A and B, respectively, are connected to receive external signals through corresponding signal pass gates A and B, respectively. The counters are interconnected through a range switch associated with feedback circuits A and B. Feedback through either of the feedback pass gates A or B shuts off both signal pass gates. Signal pass gate A may receive signals from either a time interval circuit or an oscillator circuit through corresponding pass gates as well as, or instead of, an external signal to counter B. The various pass gate hold signals labeled *a*, *b*, *c*, and *d*, respectively, are applied for selected modes of operation by proper setting of the function switch, as illustrated in the function switch legend. For instance, when the function switch is in the COUNTING position, holds *d*, *b*, *c*, and *d* (FIG. 1) are applied.

Figure 2:
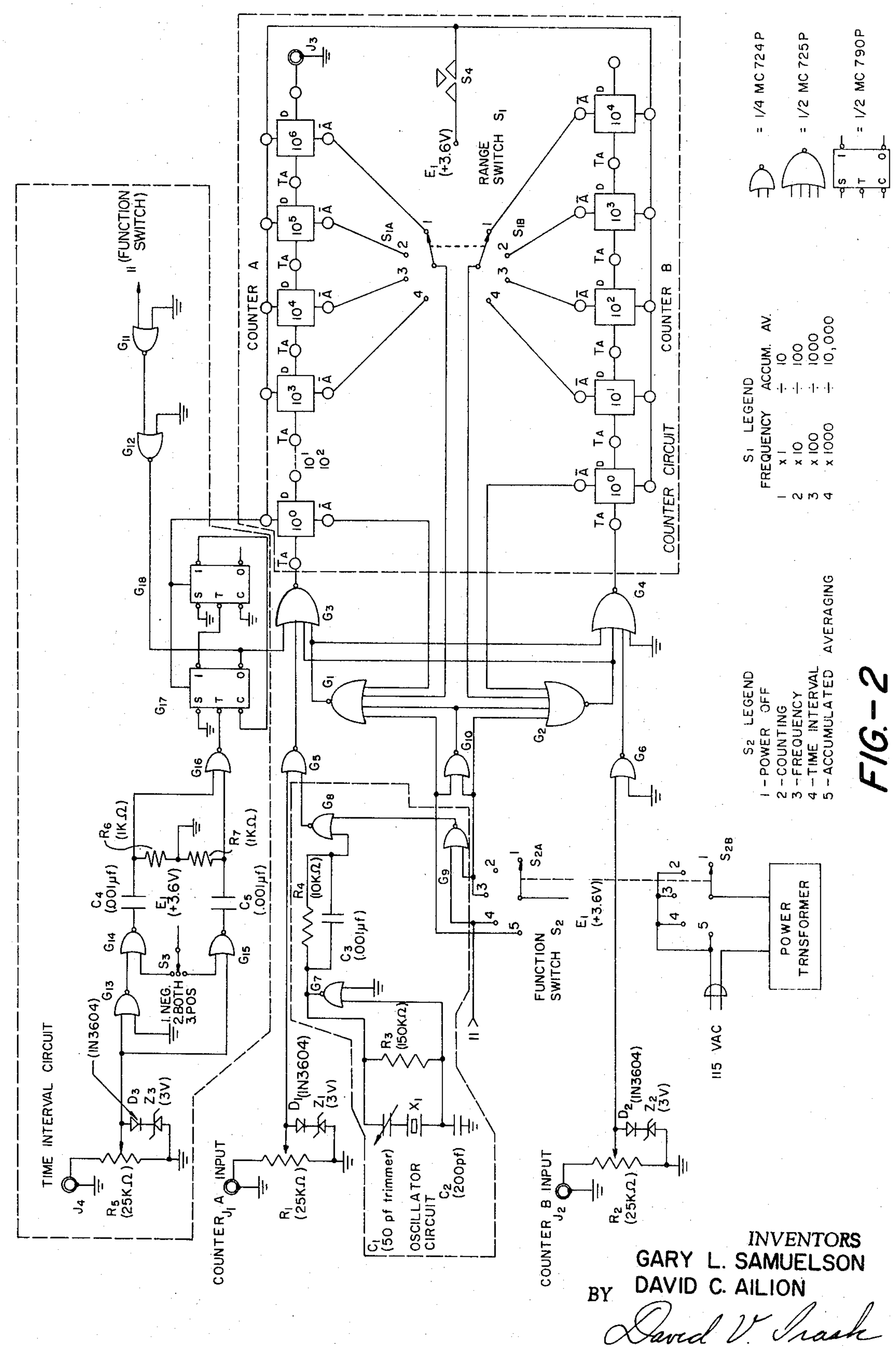
FIG. 2 is a schematic diagram corresponding to FIG. 1. Practical values of the components are given in parentheses.

According to the specific embodiment illustrated by FIG. 2, counter A is a seven-decade decimal counter and counter B is a similar five-decade counter. Any convenient counting circuits may be employed; in the illustrated instance, each decade is constructed of Motorola dual J–K flip-flops (MC790P) in conventional fashion, except that the $\bar{A}$ outputs are connected to range switch $S_1$, as illustrated. The $\bar{A}$ outputs of the last four decades of the counter B are connected to switch wafer $S_1B$, as illustrated.

The mode of operation of the counter is determined by the setting of function switch $S_2$ according to the function switch legend at the bottom left of FIG. 2. Two four-input NOR gates $G_1$ and $G_2$ have their inputs connected to the range $S_1$ and function $S_2$ switches. The output of gate $G_1$ is connected to one of the four input legs of an input gate $G_3$ for counter A while the output of gate $G_2$ is connected to one of the four input legs of an input gate $G_4$ for counter B. The $\bar{A}$ output of the first decade of counter A is connected to one of the input legs of the NOR gate $G_1$ while the $\bar{A}$ output of the first decade of counter B is connected to one of the input legs of the NOR gate $G_2$. The remainder of the claimed, multifunction counter circuit comprises a plurality of special function circuits which may be connected through appropriate settings of the function switch $S_2$ to deliver pulses to gate $G_3$.

Referring to the legend at the bottom right of FIG. 2 each of the illustrated two-input NOR gates may be any one of the four such gates provided in an MC724P integrated circuit. Each such gate consists of two high-speed transistors connected to a common collector load resistor so that if either of the transistor inputs is high, the gate output at the collector will be saturated to near ground potential. Only if all of the inputs are low (approximately 0 volts) are the transistors cutoff to permit the gate output to be high (approximately supply voltage). The illustrated four-input NOR gates may be one of two such gates provided in an MC725P integrated circuit. Each such four-input gate consists of four high-speed transistors connected to a common load resistor in the same fashion as the two-input gates so that if any transistor input is high, the gate output is low. All four of the transistor inputs must be low for the four-input NOR gate output to be high. The J–K flip-flop gates may be one of two such gates provided in an MC790P integrated circuit and have the property of making a transition whenever the input drops from a high positive value (approximately supply voltage) to a low or ground potential (approximately 0 volts).

Position 1 of the function switch $S_2$ disconnects the power transformer from the circuit. Power is supplied to the circuit with the function switch in positions 2 through 5.

With the function switch in position 2, a signal may be fed through input jack $J_1$ to counter A and/or a signal may be fed through input jack $J_2$ to counter B. Alternatively, output jack $J_3$ from counter A may be connected to input jack $J_2$ of counter B to make a continuous range counter of 12 decades.

In the A input circuit. A signal is fed to input jack $J_1$. Potentiometer $R_1$ is for level control of the signal. Zener diode $Z_1$ functions as a voltage limiter to protect the gate $G_5$. Diode $D_1$ is a high frequency diode (with small effective capacitance) which decreases the capacitance which $Z_1$ would otherwise contribute at the input to $G_5$. Zener diode $Z_1$ and diode $D_1$ coact as a high frequency voltage limiter and provide input protection for gate $G_5$ at both high and low frequencies. NOR gates $G_5$ and $G_3$ comprise a squaring circuit for the A input signal.

In the B input circuit, a signal is fed to input jack $J_2$. Potentiometer $R_2$, Zener diode $Z_2$, and diode $D_2$ function in the same fashion with respect to a B input signal introduced to input jack $J_2$ as do the corresponding components $R_1$, $Z_1$, and $D_1$ with respect to an A input signal introduced to jack $J_1$. Gates $G_6$ and $G_4$ comprise a squaring circuit for the B input signal.

Each pulse introduced to input jack $J_1$ and passed by gate $G_3$ is counted on counter A while each pulse introduced to input jack $J_2$ and passed by gate $G_4$ is counted on counter B.

As illustrated, the oscillator circuit is energized in positions 2 through 5 of the function switch $S_2$ but it is isolated from the remainder of the circuit in function switch positions 2 and 5. Pulses from the oscillator are thus applied to counter A only when the function switch is in either its position 3 (frequency counting) or its position 4 (time interval counting).

The oscillator comprises a quartz crystal $X_1$ of approximately 1 megahertz frequency. The capacitor $C_1$ is a variable capacitor for fine frequency adjustment so that the oscillator output can be tuned to precisely 1 mHz. The resistor $R_3$ biases gate $G_7$ partially on to function as an amplifier. The capacitor $C_2$ functions as a voltage divider and provides proper feedback to gate $G_7$ to maintain the quartz crystal in an oscillating state. The resistor $R_4$ isolates gate $G_8$ from gate $G_5$ while capacitor $C_3$ is a coupling capacitor sensitive to fast rise and fall of the output potential of gate $G_7$ which it passes to the input of gate $G_8$.

A high output from the gate $G_9$ (positions 2 or 5 of the function switch $S_2$) results in a constant low output from gate $G_8$ so that pulses from the oscillator circuit cannot pass gate $G_8$. In positions 3 and 4 of the function switch $S_2$, the output from gate $G_9$ applied to one input of gate $G_8$ is low. Accordingly, pulses from the oscillator circuit are passed by gate $G_8$. A high output from gate $G_8$. A high output from gate $G_8$ effects a low output from gate $G_5$ which in turn causes gate $G_3$ to apply a high output to counter A.

In function switch positions 2 and 4, the inputs to gate $G_{1}0$ are both low, so the output of gate $G_{1}0$, which is applied as an input to both gates $G_1$ and $G_2$, is high; their outputs thus remain low regardless of the potential applied to their other input legs. Accordingly, feedback through the range switch $S_1$ from the counters is blocked from gates $G_3$ and $G_4$ when the function switch is in either position 2 or position 4. In positions 3 and 5 of the function switch, an input to gate $G_{1}0$ is high so that its output applied to gates $G_1$ and $G_2$ is low. In position 3 (frequency counting), the gate $G_1$ passes feedback voltages from counter A through the range switch, but the gate $G_2$ output remains constantly low and will not pass feedback from counter B because the power supply potential $E_1$ is connected directly to one of its input legs. In position 5 (accumulated averaging), the gate $G_2$ passes feedback from the counter B through the range switch, but gate $G_1$ has $E_1$ potential applied to one of its inputs and will not pass feedback from counter A. When feedback can pass either of gates $G_1$ or $G_2$, the outputs of both gates $G_3$ and $G_4$ remain constantly low and counters A and B are both stopped.

The time interval circuit is connected by conductor 11 to position 4 of the function switch $S_2$ so that this circuit is energized only in position 4. In every other position the input potential on gate $G_{1}1$ is low so that the output of gate $G_{1}2$ is low. Accordingly, the corresponding input of gate $G_3$ is at constantly low potential. With the function switch in its position 4, however, the input to gate $G_3$ from gate $G_{1}2$ is high so that counter A is held off, but counter B is unaffected. As previously mentioned, feedback from both counters is blocked when the function switch $S_2$ is in position 4. Input to the time interval circuit is through jack $J_4$. Zener diode $Z_3$ and diode $D_3$ function as a high frequency voltage limiter and potentiometer $R_5$ provides level control in the same fashion as the corresponding components described in connection with input jacks $J_1$ and $J_2$.

The signal input to jack $J_4$ is inverted by the gate $G_{1}3$ and applied in that form to gate $G_{1}4$. The uninverted signal is applied directly to gate $G_{1}5$. The outputs of gates $G_{1}4$ and $G_{1}5$ are connected to differentiating circuits comprised of capacitor $C_4$ and resistor $R_6$, and capacitor $C_5$ and resistor $R_7$, respectively. The differentiating circuits convert the output signals of the respective gates to positive-going spikes. Both gates deliver both positive-going and negative-going spikes but in reverse order. The gate $G_{1}6$ will respond only to positive-going spikes so that the output of this gate, applied to gate $G_{1}7$, is always in the form of negative-going spikes. These spikes will be in response to positive-going spikes from gates $G_{1}4$, $G_{1}5$, or both, as determined by a slope switch $S_3$.

When the slope switch $S_3$ is in its position number 1, a negative-going spike occurs at the output of gate $G_{1}6$ when gate $G_{1}5$ delivers a positive-going spike. Gate $G_{1}4$ is in saturation due to potential $E_1$ applied at its input. This switch position is preferred for determining the time interval between periodic fast-dropping pulses. In position 2, successive, negative-going spikes occur at the output of gate $G_{1}6$ in response to positive-going spikes delivered from gates $G_{1}4$ and $G_{1}5$, respectively. These spikes correspond to both the leading and trailing edges of a single pulse whose width it is desired to measure. In position 3, a negative-going spike occurs at the output of gate $G_{1}6$ in response to positive-going spikes from gate $G_{1}4$ while gate $G_{1}5$ is in saturation due to potential $E_1$ applied at one of its inputs. This switch position is preferred for determining the time interval of fast-rising pulses.

Gates $G_{1}7$ and $G_{1}8$ are J–K flip-flop gates connected such that the normally high 0 output of gate $G_{1}7$ is applied to hold gate $G_3$ off. The first negative-going spike from gate $G_{1}6$ reverses the state of gate $G_{1}7$ so that its 0 output potential is low and the output from the oscillator circuit (a constant pulse train of 1 mHz. frequency), is fed through gate $G_3$ to counter A. The second negative-going pulse from gate $G_{1}6$ reverses the state of both gates $G_{1}7$ and $G_{1}8$. Accordingly, the 0 output from gate $G_{1}7$ is high and blocks further input to counter A from the oscillator circuit. At the same time, the 1 output of gate $G_{1}8$ becomes high and is applied to gate $G_{1}7$ to lock the 0 output of gate $G_{1}7$ into its high state, regardless of additional negative-going spikes emitted from gate $G_{1}6$.

Thus, the multipurpose counter of this invention may be used for a variety of applications depending upon the settings of the function switch and the range switch. In position 1 of the function switch, all power is off. In position 2 the counters A and B may be operated as separate counters to accumulate pulses independently, or may be combined as a single extended range counter. In position 3, counter B accumulates pulses from the B input while the oscillator is gated on and fed into counter A. With the range switch in its 1 position, counter A will count to $10^6$ and then apply high potential (hold voltages) to the counting gates $G_3$ and $G_4$. The reading on counter B will then represent the number of input pulses per second. In position number 2 of the range switch, only $10^5$ counts are received from the oscillator before the hold voltages are applied thereby allowing counting for 0.1 seconds rather than for a full second. The reading on counter B is thus 1/10 the frequency of the signal delivered to input jack $J_2$. In position number 4 of the function switch, counter A accumulates pulses from the oscillator during the time interval between two successive events. Thus, the interval in seconds between two successive leading edges, two successive trailing edges, or the leading and trailing edges of a particular pulse in a pulse train may be determined by dividing the counts accumulated by counter A by $10^6$. In position 5 of the function switch, counter A receives bursts of pulses and accumulates them in a running sum while counter B is pulsed once before each burst to record the number of such events. The range switch setting determines the number of bursts allowed to accumulate on counter B before both counters are turned off. A reset switch $S_4$ is provided in circuit with counters A and B to place all decades in their zero counting states after a measurement has been completed.

An important aspect of the present invention is the high frequency input protection for solid state devices provided by connecting a high frequency diode and a Zener diode, in series, between a reference potential (such as ground) and the input to the device. The frequency response of the Zener diode is increased in this fashion to approximately that of the do diode, being limited only by the effective capacitance of the diode. The use of a capacitor instead of the diode to reduce the shunt capacitance of a Zener diode results in the blocking of low frequencies. A capacitor is thus unsuitable for applications such as illustrated herein where input protection at both high and low frequencies is desired.

Reference herein to details of the illustrated embodiment is not intended to limit the scope of the claims which themselves recite those features regarded as essential to the invention.

We claim:

1. A multipurpose electronic counter, comprising:

first and second multiple-decade decimal counters with selected decades connected through a range switch to respective first and second feedback pass gates;

first and second signal pass gates connected between said feedback pass gates and said decimal counters such that feedback passed through either feedback pass gate will block signals from passing both signal pass gates;

an oscillator circuit connected to apply a constant frequency pulse train through an oscillator pass gate to to one said signal pass gate;

a time interval circuit including a time interval pass gate which normally applies a blocking potential to one said signal pass gate, said blocking potential being reversible to a nonblocking potential in response to the first pulse generated by said time interval circuit for an interval terminating with the second pulse generated by said time interval circuit; and a function switch in circuit with each of the aforementioned pass gates and a power supply to apply blocking potential to:

both feedback pass gates, the oscillator pass gate, and the time interval pass gate in a first position so that either counter may receive external signals;

the feedback pass gate associated with one said decimal counter and the time interval pass gate in a second position so that the other said decimal counter accumulates pulses from said oscillator circuit to a sum determined by the setting of said range switch and then applies a blocking potential to both signal pass gates;

both feedback pass gates in a third position so that the said decimal counter associated with the oscillator pass gate accumulates pulses from said oscillator circuit for the time interval that its associated signal pass gate is unblocked, as determined by the time interval pass gate; and the feedback pass gate associated with one of said decimal counters, the oscillator pass gate and the time interval pass gate in a fourth position so that both decimal counters can receive external signals until the counts accumulated by the counter associated with the other said feedback pass gate reaches a sum determined by the setting of the said range switch.

2. The multipurpose counter of claim 1, wherein the signal pass gates and the feedback pass gates are inverting NOR gates, and the oscillator and time interval circuits are connected to inputs of the same signal pass gate.

3. The multipurpose counter of clam 2, wherein the output of each feedback pass gate is connected to inputs of each signal pass gate.

4. The multipurpose counter of claim 1, wherein high frequency input protection for said signal pass gates is provided by connecting a high frequency diode and a Zener diode in series between ground and the signal input to each said gate.

5. The multipurpose counter of claim 1 wherein high frequency input protection for said signal pass gates is provided by connecting a high frequency diode and a Zener diode in series between a reference potential and the signal input to each said gate.